(12) United States Patent
Hideshima et al.

(10) Patent No.: US 12,311,437 B2
(45) Date of Patent: *May 27, 2025

(54) THIXOMOLDING MATERIAL

(71) Applicant: SEIKO EPSON CORPORATION, Tokyo (JP)

(72) Inventors: Yasutoshi Hideshima, Matsumoto (JP); Setsuya Iwashita, Nirasaki (JP); Fumiya Maeda, Azumino (JP); Shunsuke Uchizono, Shiojiri (JP); Koichi Ozaki, Okayama (JP); Tadao Fukuta, Kurashiki (JP)

(73) Assignee: SEIKO EPSON CORPORATION, Tokyo (JP)

( * ) Notice: Subject to any disclaimer, the term of this patent is extended or adjusted under 35 U.S.C. 154(b) by 369 days.

This patent is subject to a terminal disclaimer.

(21) Appl. No.: 17/656,544

(22) Filed: Mar. 25, 2022

(65) Prior Publication Data

US 2022/0314314 A1  Oct. 6, 2022

(30) Foreign Application Priority Data

Mar. 30, 2021  (JP) .................................. 2021-057130

(51) Int. Cl.
*B22F 1/16* (2022.01)
*B22D 17/00* (2006.01)
(Continued)

(52) U.S. Cl.
CPC .............. *B22F 1/16* (2022.01); *B22D 17/007* (2013.01); *B22D 23/06* (2013.01); *B22F 1/05* (2022.01);
(Continued)

(58) Field of Classification Search
CPC .. B22F 2302/40; B22F 2301/058; B22F 8/00; B22F 3/225; B22F 3/003; B22F 2998/10; B22F 1/16; B22F 1/05; B22F 1/102; B22F 1/14; B22F 1/107; B22F 1/142; B22F 1/068; B22F 1/10; B22F 1/12; B32B 15/012; C22C 1/01084; C22C 1/05; C22C 32/0084; B22D 17/007; B22D 23/06; Y10T 428/12229; Y10T 428/12181; Y10T 428/12556; Y10T 428/12569;
(Continued)

(56) References Cited

U.S. PATENT DOCUMENTS 6,126,712 A   10/2000 Hohne et al.
6,467,527 B1  10/2002 Kubota et al.
(Continued)

FOREIGN PATENT DOCUMENTS

CN   101439405 A   5/2009
JP   H10158756 A   6/1998
(Continued)

*Primary Examiner* — Michael E. La Villa
(74) *Attorney, Agent, or Firm* — CHIP LAW GROUP

(57) ABSTRACT

Provided is a thixomolding material including a metal body that contains Mg as a main component, and a coating portion that is adhered to a surface of the metal body via a binder and contains C particles containing C as a main component. A mass fraction of the C particles in a total mass of the metal body and the C particles is 5.0 mass % or more and 40.0 mass % or less. The binder may contain waxes. The C particles may be graphite particles.

3 Claims, 3 Drawing Sheets

(51) Int. Cl.
| | |
|---|---|
| *B22D 23/06* | (2006.01) |
| *B22F 1/05* | (2022.01) |
| *B22F 1/068* | (2022.01) |
| *B22F 1/10* | (2022.01) |
| *B22F 1/102* | (2022.01) |
| *B22F 1/12* | (2022.01) |
| *B22F 1/14* | (2022.01) |
| *B22F 3/22* | (2006.01) |
| *B22F 8/00* | (2006.01) |
| *B32B 1/00* | (2006.01) |
| *B32B 15/01* | (2006.01) |
| *B32B 15/04* | (2006.01) |
| *B32B 15/08* | (2006.01) |
| *B32B 15/16* | (2006.01) |
| *C22C 1/10* | (2023.01) |
| *C22C 32/00* | (2006.01) |
| *B22F 3/00* | (2021.01) |
| *C22C 1/05* | (2023.01) |

(52) U.S. Cl.
CPC ............... *B22F 1/068* (2022.01); *B22F 1/10* (2022.01); *B22F 1/102* (2022.01); *B22F 1/12* (2022.01); *B22F 1/14* (2022.01); *B22F 3/225* (2013.01); *B22F 8/00* (2013.01); *B32B 1/00* (2013.01); *B32B 15/04* (2013.01); *B32B 15/08* (2013.01); *B32B 15/16* (2013.01); *C22C 1/1084* (2013.01); *C22C 32/0084* (2013.01); *B22F 3/003* (2013.01); *B22F 2301/058* (2013.01); *B22F 2302/40* (2013.01); *B22F 2998/10* (2013.01); *C22C 1/05* (2013.01); *Y10T 428/12181* (2015.01); *Y10T 428/12229* (2015.01); *Y10T 428/12556* (2015.01); *Y10T 428/12569* (2015.01); *Y10T 428/12576* (2015.01); *Y10T 428/12625* (2015.01); *Y10T 428/12729* (2015.01); *Y10T 428/29* (2015.01); *Y10T 428/2918* (2015.01); *Y10T 428/2927* (2015.01); *Y10T 428/2933* (2015.01); *Y10T 428/2938* (2015.01); *Y10T 428/2947* (2015.01); *Y10T 428/2982* (2015.01); *Y10T 428/2991* (2015.01); *Y10T 428/2998* (2015.01)

(58) Field of Classification Search
CPC ..... Y10T 428/12576; Y10T 428/12625; Y10T 428/12729; Y10T 428/2927; Y10T 428/2918; Y10T 428/29; Y10T 428/2933; Y10T 428/2938; Y10T 428/2947; Y10T 428/2982; Y10T 428/2991; Y10T 428/2998
See application file for complete search history.

(56) References Cited

U.S. PATENT DOCUMENTS

| | | | |
|---|---|---|---|
| 6,769,473 | B1 | 8/2004 | Adachi et al. |
| 11,865,609 | B2 * | 1/2024 | Ozaki ................. B22D 17/007 |
| 11,866,808 | B2 * | 1/2024 | Hideshima ........... C22C 1/1084 |
| 2002/0040077 | A1 | 4/2002 | Hanejko et al. |
| 2005/0161127 | A1 | 7/2005 | Adachi et al. |
| 2006/0034723 | A1 | 2/2006 | Poszmik |
| 2006/0057015 | A1 | 3/2006 | Kondoh |
| 2006/0219056 | A1 | 10/2006 | Larink |
| 2008/0213118 | A1 | 9/2008 | Kondoh |
| 2014/0023547 | A1 | 1/2014 | Mitooka et al. |
| 2016/0074942 | A1 | 3/2016 | Fang et al. |
| 2021/0291265 | A1 * | 9/2021 | Hideshima .............. B22F 1/102 |
| 2021/0291266 | A1 * | 9/2021 | Ozaki .................... B22F 1/068 |

FOREIGN PATENT DOCUMENTS

| | | |
|---|---|---|
| JP | H10168502 A | 6/1998 |
| JP | 2001009561 A | 1/2001 |
| JP | 2007291438 A | 11/2007 |
| KR | 1020160106843 A | 9/2016 |
| WO | 2004062837 A | 7/2004 |
| WO | 2012137907 A1 | 10/2012 |

* cited by examiner

THIXOMOLDING MATERIAL

The present application is based on, and claims priority from JP Application Serial Number 2021-057130, filed Mar. 30, 2021, the disclosure of which is hereby incorporated by reference herein in its entirety.

BACKGROUND

1. Technical Field

The present disclosure relates to a thixomolding material, a method for manufacturing a thixomolding material, and a thixomolded article.

2. Related Art

Magnesium has properties such as a low specific gravity, a good electromagnetic wave shielding property, good vibration damping capability, good machinability, and good biosafety. Based on such a background, parts made of magnesium alloys are beginning to be used in products such as automobiles, aircraft, mobile phones, and notebook computers.

As a method for manufacturing a part made of magnesium, a thixomolding method is known. The thixomolding method is a molding method in which a pellet-like or chip-like material is heated in a cylinder to bring the material into a solid-liquid coexistence state in which a liquid phase and a solid phase coexist, thixotropy is developed by rotation of a screw, and the obtained semi-solidified product is injected into a mold. According to such a thixomolding method, since fluidity of the semi-solidified product is enhanced by heating and shearing, a part having a small thickness or a part having a complicated shape can be formed as compared with a die casting method.

For example, WO 2012/137907 discloses a method for manufacturing a molding chip in which 0.01 wt % to 3 wt % of carbon black is added to a magnesium chip, and carbon black and the magnesium chip are mixed with a mixer to coat a surface of the magnesium chip with a carbon powder. According to such a molding chip coated with the carbon powder, it is possible to improve bending characteristics and tensile strength of a molded article manufactured by injection molding.

The molded article manufactured using the magnesium alloy chip described in WO 2012/137907 has a problem of low thermal conductivity. It is difficult to apply a molded article having low thermal conductivity to a part or the like that requires heat dissipation. Therefore, the thermal conductivity of a thixomolded article is required to be further improved.

SUMMARY

A thixomolding material according to an application example of the present disclosure includes: a metal body that contains Mg as a main component; and a coating portion that is adhered to a surface of the metal body via a binder and contains C particles containing C as a main component. A mass fraction of the C particles in a total mass of the metal body and the C particles is 5.0 mass % or more and 40.0 mass % or less.

A method for manufacturing a thixomolding material according to an application example of the present disclosure includes: a preparation step of preparing a mixture containing a metal body containing Mg as a main component, C particles containing C as a main component, a binder, and a solvent; a stirring step of stirring the mixture; and a debindering step of removing, by heating the stirred mixture, at least a part of the binder contained in the mixture to obtain a thixomolding material. A mass fraction of the C particles in a total mass of the metal body and the C particles is 5.0 mass % or more and 40.0 mass % or less, and a content of the binder in the thixomolding material is 0.001 mass % or more and 0.200 mass % or less.

A thixomolded article according to an application example of the present disclosure includes: a matrix portion that contains Mg as a main component; and a particle portion that is dispersed in the matrix portion and contains C as a main component. An average aspect ratio of the particle portion is 2.0 or more and 20.0 or less, and a content of C is 5.0 mass % or more and 40.0 mass % or less.

DESCRIPTION OF EXEMPLARY EMBODIMENTS

Hereinafter, a thixomolding material, a method for manufacturing a thixomolding material, and a thixomolded article according to the present disclosure will be described in detail based on embodiments illustrated in the accompanying drawings.

1. Thixomolding Method

First, a thixomolding method using a thixomolding material according to an embodiment will be described.

The thixomolding method is a molding method in which a pellet-like or chip-like material is heated in a cylinder to bring the material into a solid-liquid coexistence state in which a liquid phase and a solid phase coexist, then thixotropy is developed by rotation of a screw, and the obtained semi-solidified product is injected into a mold. According to such a thixomolding method, since fluidity of the semi-solidified product is enhanced by heating and shearing, a part having a small thickness or a part having a complicated shape can be molded as compared with, for example, a die casting method.

Figure 1:
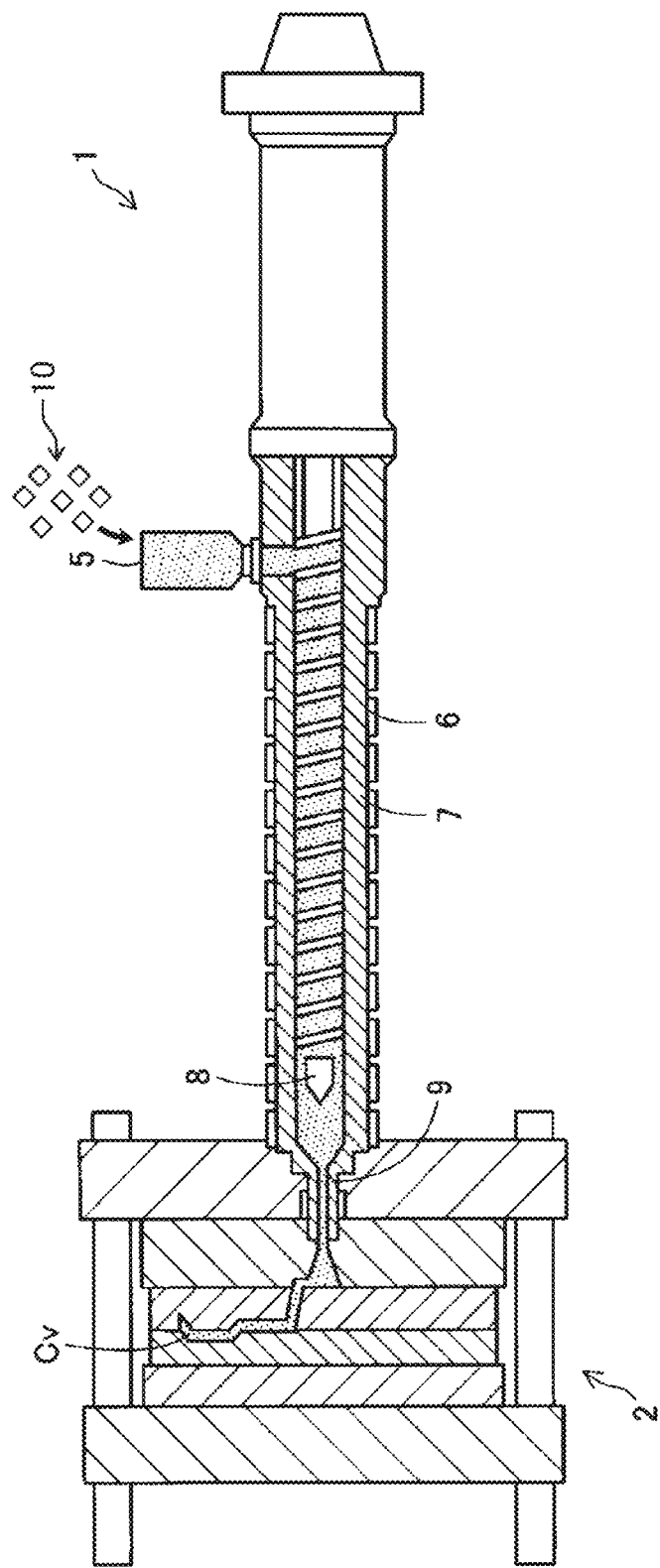
FIG. 1 is a cross-sectional view showing an example of an injection molding machine used for a thixomolding method.

FIG. 1 is a cross-sectional view showing an example of an injection molding machine used for the thixomolding method.

As shown in FIG. 1, an injection molding machine 1 includes a mold 2, a hopper 5, a heating cylinder 7, a screw 8, and a nozzle 9. In the mold 2, a cavity Cv is formed. When a thixomolding material 10 is charged into the hopper 5, the thixomolding material 10 is supplied to the heating cylinder 7. The thixomolding material 10 supplied to the heating cylinder 7 is transferred while being heated by a heater 6 and being sheared by the screw 8. Accordingly, the thixomolding material 10 is semi-melted and slurried. The obtained slurry is injected into the cavity Cv in the mold 2 through the nozzle 9 without being exposed to the atmosphere. Then, the slurry injected into the cavity Cv is cooled to obtain a thixomolded article.

The hopper 5 may be charged with other materials together with the thixomolding material 10.

2. Thixomolding Material

Next, a thixomolding material according to an embodiment will be described.

Figure 2:
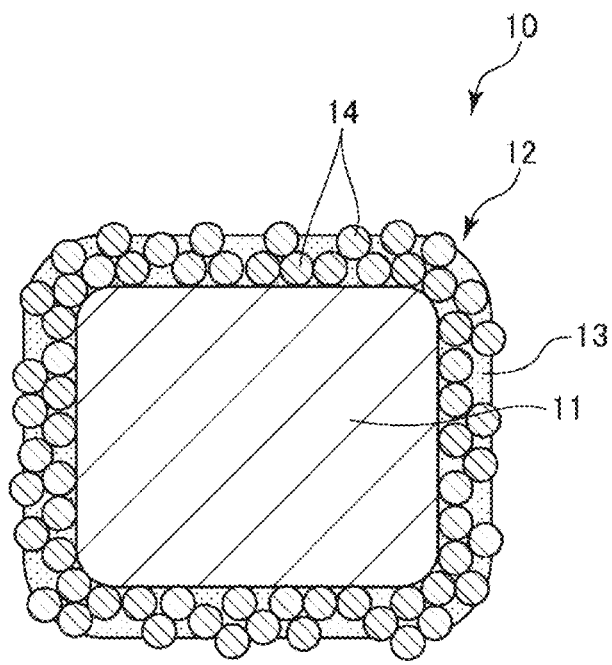
FIG. 2 is a cross-sectional view schematically showing a thixomolding material according to an embodiment.

FIG. 2 is a cross-sectional view schematically showing the thixomolding material according to the embodiment.

The thixomolding material 10 shown in FIG. 2 is a raw material to be used in the thixomolding method, and includes a chip-like metal body 11, a coating portion 12 that adheres to the surface of the metal body 11, and an adhesive portion 13 that contains a binder and adheres the metal body 11 to the coating portion 12.

2.1. Metal Body

The metal body 11 is, for example, a section obtained by machining or cutting an Mg-based alloy cast with a mold or the like. A method for manufacturing the metal body 11 is not limited thereto.

The metal body 11 contains Mg as a main component and contains various additive components. Examples of the additive components include lithium, beryllium, calcium, aluminum, silicon, manganese, iron, nickel, copper, zinc, strontium, yttrium, zirconium, silver, tin, gold, and rare earth elements, and a mixture of one or more of the additive components is used. Examples of the rare earth elements include cerium.

The main component refers to an element having the highest content in the metal body 11. The content of the main component is preferably more than 50 mass %, more preferably 70 mass % or more, and still more preferably 80 mass % or more.

The additive components may include aluminum and zinc. Accordingly, the melting point of the metal body 11 is lowered, and the fluidity of the slurry is improved. As a result, moldability of the thixomolding material 10 can be enhanced.

In addition, the additive components may include at least one selected from the group consisting of manganese, yttrium, strontium, and rare earth elements in addition to aluminum and zinc. Accordingly, mechanical properties, corrosion resistance, abrasion resistance, and thermal conductivity of the thixomolded article can be enhanced.

The additive components may be present in a form of a simple substance, an alloy, an oxide, an intermetallic compound, and the like in the metal body 11. In addition, the additive components may be segregated or uniformly dispersed in a crystal grain boundary of a metal structure such as Mg or an Mg alloy in the metal body 11.

The average particle diameter of the thixomolding material 10 is not particularly limited, and is preferably 0.5 mm or more, and more preferably 1.5 mm or more and 10 mm or less. By setting the average particle diameter within the above range, generation of bridges and the like in the heating cylinder 7 of the injection molding machine 1 can be prevented.

The average particle diameter of the thixomolding material 10 is an average value of diameters of circles having the same area as a projected area of the thixomolding material 10. The average value is calculated based on 100 or more thixomolding materials 10 selected at random.

An average aspect ratio of the thixomolding material 10 is preferably 5.0 or less, and more preferably 4.0 or less. In the thixomolding material 10 having such an average aspect ratio, a filling property in the heating cylinder 7 is enhanced and temperature uniformity during heating is improved. As a result, a thixomolded article having high mechanical properties and high dimensional accuracy can be obtained.

The average aspect ratio of the thixomolding material 10 is an average value of aspect ratios calculated based on major axis/minor axis in a projection image of the thixomolding material 10. The average value is calculated based on 100 or more thixomolding materials 10 selected at random. The major axis is the maximum length that can be taken in the projection image, and the minor axis is the maximum length in the direction orthogonal to the major axis.

2.2. Coating Portion

The coating portion 12 contains C particles 14 containing C as a main component. Specifically, for example, a plurality of C particles 14 are adhered to the surface of the metal body 11 to form the coating portion 12.

The coating portion 12 preferably covers the entire surface of the metal body 11, or may cover a part of the surface. The coating portion 12 imparts fluidity to the thixomolding material 10 due to lubricity of carbon. That is, melt fluidity of the slurry is increased, and internal defects due to inclusion of blowholes and air are less likely to occur in the thixomolded article. In addition, the C particles 14 have excellent thermal conductivity derived from carbon. For example, the thermal conductivity of a magnesium alloy is about 50 W/(m·K) to 80 W/(m·K), and the thermal conductivity of carbon is about 100 W/(m·K) to 250 W/(m·K). Due to such a difference in thermal conductivity, the thermal conductivity of the thixomolded article containing the C particles 14 can be made higher than that of the magnesium alloy.

The C particles 14 are not particularly limited as long as they are particles containing carbon as a main component, and the C particles 14 may be particles containing amorphous carbon as a main material, such as carbon black, and are preferably graphite particles. The graphite particles are particles mainly made of graphite, that is, graphite having a plate-like crystal structure. The plate-like crystal structure of graphite is a structure in which sheet-like graphene is laminated, and imparts particularly high lubricity to the C particles 14 because bonding strength between layers is weak. In addition, graphene is characterized in that bonding strength in an in-plane direction is higher than the bonding strength between layers, and thermal conductivity in the in-plane direction is excellent. Therefore, even when a shear force is applied by the screw 8 and the bonding between the layers is released, the thermal conductivity of the coating portion 12 is maintained high. As a result, a thixomolded article having excellent thermal conductivity and mechanical strength which is less likely to decrease can be obtained.

An average particle diameter of the C particles 14 is not particularly limited, and is preferably 1 μm or more and 100 μm or less, more preferably 1 μm or more and 25 μm or less, and still more preferably 2 μm or more and 15 μm or less. By setting the average particle diameter of the C particles 14 within the above range, the balance between a coverage of the coating portion and the C content in the thixomolding material 10 can be optimized. In addition, when the C particles 14 are adhered to the surface of the metal body 11, the C particles 14 are less likely to fall off.

When the average particle diameter of the C particles 14 is less than the above lower limit value, the C particles 14 are less likely to be dispersed, and thus the above-described balance may be deteriorated. On the other hand, when the average particle diameter of the C particles 14 is more than the above upper limit value, the C particles 14 may easily fall off.

In the thixomolding material 10, the mass fraction of the C particles 14 in the total mass of the metal body 11 and the C particles 14 is 5.0 mass % or more and 40.0 mass % or less, preferably 7.0 mass % or more and 25.0 mass % or less, and more preferably 10.0 mass % or more and 20.0 mass % or less. By setting the mass fraction of the C particles 14 within the above range, the thermal conductivity of the thixomolded article can be sufficiently enhanced while preventing a large decrease in mechanical properties of the thixomolded article to be manufactured. Such a thixomolded article can also be applied to, for example, a portion requiring heat dissipation.

When the mass fraction of the C particles 14 is less than the above lower limit value, the thermal conductivity of the thixomolded article may not be sufficiently enhanced. On the other hand, when the mass fraction of the C particles 14 is more than the above upper limit value, the mechanical properties of the thixomolded article may be deteriorated.

The coating portion 12 may contain a substance other than the C particles 14. In this case, the content of the substance other than the C particles 14 may be less than the content of the C particles 14 in terms of mass ratio.

The C particles 14 may contain an element other than C. In this case, the content of the element other than C may be less than the content of C in terms of mass ratio.

2.3. Adhesive Portion

The adhesive portion 13 is interposed between the metal body 11 and the C particles 14 or between the C particles 14.

The adhesive portion 13 contains a binder. As the binder, organic materials that bond the metal body 11 to the coating portion 12 are used. Examples of the organic materials include various resins, waxes, alcohols, higher fatty acids, fatty acid metals, higher fatty acid esters, higher fatty acid amides, nonionic surfactants, and silicone-based lubricants. The various resins include: polyolefins such as polyethylene, polypropylene, and ethylene-vinyl acetate copolymers; acrylic resins such as polymethyl methacrylate and polybutyl methacrylate; styrene resins such as polystyrene; polyvinyl chloride; polyvinylidene chloride; polyamide; polyesters such as polyethylene terephthalate and polybutylene terephthalate; polyether; polyvinyl alcohol; polyvinyl pyrrolidone; or copolymers thereof. In addition, the binder may be a mixture containing at least one of these components and another component, or may be a mixture containing two or more of these components.

Among these, the binder preferably contains waxes, and more preferably contains paraffin wax or a derivative thereof. The waxes have a good binding property, and can strongly bond the metal body 11 to the C particles 14 or strongly bond the C particles 14 to each other. When using the waxes in combination with debindering conditions, it is possible to obtain a thixomolding material capable of reducing generation of gas during molding to a low level.

Examples of the waxes include natural waxes and synthetic waxes. The natural waxes include: plant waxes such as candelilla wax, carnauba wax, rice wax, Japan wax, and jojoba oil; animal waxes such as beeswax, lanolin, and spermaceti; mineral waxes such as Montan wax, ozokerite, and ceresin; and petroleum waxes such as paraffin wax, microcrystalline wax, and petrolatum. The synthetic waxes include: modified waxes such as synthetic hydrocarbons such as polyethylene wax, Montan wax derivatives, paraffin wax derivatives, and microcrystalline wax derivatives; hydrogenated waxes such as hardened castor oil and hardened castor oil derivatives; fatty acids such as 12-hydroxystearic acid; acid amides such as stearamide; and esters such as phthalic anhydride ester.

As described above, the thixomolding material 10 according to the embodiment includes the metal body 11 and the coating portion 12, and the mass fraction of the C particles 14 in the total mass of the metal body 11 and the C particles 14 is 5.0 mass % or more and 40.0 mass % or less. The metal body 11 contains Mg as a main component. The coating portion 12 adheres to the surface of the metal body 11 via the binder, and contains the C particles 14 containing C as a main component.

By using such a thixomolding material 10, a thixomolded article containing a relatively large amount of C can be easily manufactured. Such a thixomolded article has high thermal conductivity due to C contained in a high concentration. As a result, it is possible to obtain a thixomolded article also applicable to, for example, a portion requiring heat dissipation. In the thixomolded article, a portion having a locally high content of C derived from the coating portion 12 is formed. Since this portion follows the shape of the coating portion 12, this portion has a high aspect ratio, that is, an elongated shape. Accordingly, this portion functions as a filler that enhances mechanical properties such as tensile strength and rigidity. As a result, by using the thixomolding material 10, a thixomolded article having excellent mechanical properties can be manufactured.

The thixomolding material 10 may contain additives other than the metal body 11, the coating portion 12, and the adhesive portion 13 described above. Examples of the additives include a coupling agent, a surfactant, a dispersant, a lubricant, an antioxidant, an ultraviolet absorber, a thickener, a rust inhibitor, a preservative, and a fungicide.

3. Method for Manufacturing Thixomolding Material

Next, a method for manufacturing the above-mentioned thixomolding material 10 will be described.

Figure 3:
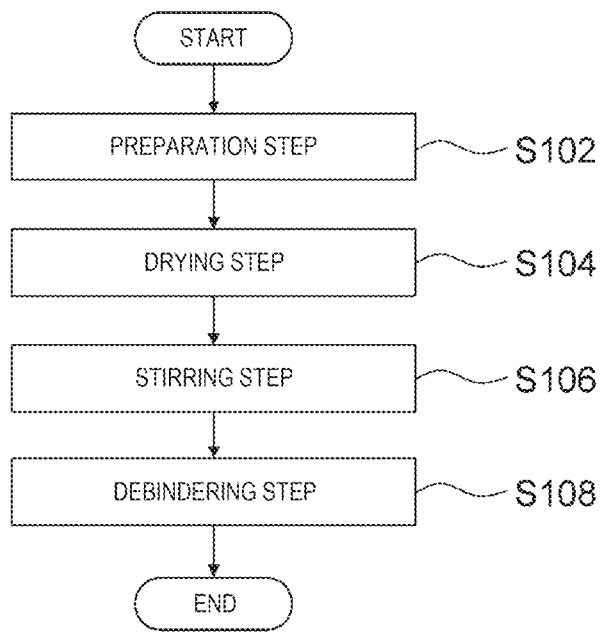
FIG. 3 is a process diagram illustrating a method for manufacturing the thixomolding material according to the embodiment.

FIG. 3 is a process diagram illustrating the method for manufacturing the thixomolding material according to the embodiment.

The method for manufacturing the thixomolding material 10 shown in FIG. 3 includes a preparation step S102, a drying step S104, a stirring step S106, and a debindering step S108.

3.1. Preparation Step

In the preparation step S102, a mixture containing a metal body 11, C particles 14, a binder, and a solvent is prepared.

The solvent is not particularly limited as long as it is a liquid in which the binder is dispersed. Examples of the solvent include water, isopropanol, and acetone. For mixing, a mixer, a kneader, or the like is used. This step may be a step of preparing a mixture prepared in advance.

The content of the binder in the mixture is not particularly limited, and is preferably 1 mass % or more and 30 mass % or less, more preferably 2 mass % or more and 15 mass % or less, and still more preferably 3 mass % or more and 10 mass % or less. By setting the content of the binder within the above range, the C particles 14 can be uniformly dispersed based on a dispersion action of the binder.

When the content of the binder is less than the above lower limit value, an amount of the binder is insufficient, and it may be difficult to uniformly adhere the C particles 14 to the metal body 11, and it may be difficult to uniformly disperse the C particles 14. On the other hand, when the content of the binder is more than the above upper limit value, the amount of the binder becomes excessive, and the C particles 14 which are not adhered to the metal body 11 may easily aggregate, and thus an amount of the binder residue may increase in the debindering step S108 described later and an internal defect may easily occur in the thixomolded article.

The temperature of the solvent is preferably set to be equal to or higher than the melting point of the binder, if necessary. Accordingly, the binder is easily dissolved in the solvent. As a result, the binder can be dispersed more uniformly. The temperature of the solvent is preferably set to be higher than the melting point of the binder by 10° C. or more, and more preferably set to be higher by 20° C. or more and 50° C. or less.

In this case, the above-described mixture may be placed in a container, and the entire container may be heated from the outside using a hot bath or the like.

The melting point of the binder to be used is not particularly limited, and is preferably 40° C. or higher and 80° C. or lower, more preferably 43° C. or higher and 65° C. or lower, and still more preferably 45° C. or higher and 60° C. or lower. When the melting point of the binder is within the above range, the binder can be efficiently melted in a short time. In addition, when the melting point of the binder is within the above range, the thixomolding material 10 to be manufactured may have good lubricity in thixomolding, and can increase melt fluidity of the slurry.

3.2. Drying Step

In the drying step S104, the mixture is dried. Accordingly, the C particles 14 are adhered to the surface of the metal body 11 via the binder, and the solvent is volatilized to obtain a dried body. In the present embodiment, since the C particles 14 are dispersed using the binder, the C particles 14 can be adhered to the surface of the metal body 11 with a uniform thickness.

For drying, a method of heating the mixture, a method of exposing the mixture to a gas, or the like is used. Among these methods, when the mixture is heated, for example, the entire container containing the mixture may be heated using a hot bath or the like. In the drying step S104, the entire solvent in the mixture may be removed, or a part of the solvent may remain without being removed.

A temperature at which the mixture is heated may be equal to or higher than the temperature at which the solvent volatilizes and the binder softens, specifically, the temperature is set according to a composition of the solvent, and is preferably 40° C. or higher and 120° C. or lower, and more preferably 50° C. or higher and 80° C. or lower. Accordingly, the solvent can be volatilized and removed while preventing the C particles 14 adhered to the surface of the metal body 11 from falling off as the binder softens.

In addition, a time for heating the mixture is appropriately set depending on the heating temperature, and is, for example, preferably 10 minutes or longer and 300 minutes or shorter, and more preferably 20 minutes or longer and 200 minutes or shorter.

The drying step S104 may be performed as necessary, and may be omitted, or the drying step S104 and the stirring step S106 may be performed at the same time.

3.3. Stirring Step

In the stirring step S106, the mixture is stirred. When the drying step is performed, the dried mixture is stirred. For stirring, a method using a stirring bar, a stirrer, or the like, a method of shaking a container containing a mixture with a lid, or the like is used. By such stirring, the C particles 14 can be adhered to the surface of the metal body 11 via the binder. A part of the C particles 14 may be directly adhered to the surface of the metal body 11 without interposing the binder. In addition, by stirring, formation of a block by aggregation of metal bodies 11 can be prevented.

After the stirring step S106, the drying step S104 and the stirring step S106 may be repeated as necessary. Accordingly, since the C particles 14 are repeatedly adhered, the C particles 14 can be adhered to the surface of the metal body 11 in multiple layers. As a result, more C particles 14 can be adhered to the surface of the metal body 11. The number of repetitions is not particularly limited, and is, for example, 2 or more and 10 or less. Also in this case, the drying step S104 and the stirring step S106 may be performed at the same time.

3.4. Debindering Step

In the debindering step S108, a debindering treatment is performed on the stirred mixture. Accordingly, the thixomolding material 10 is obtained. Examples of the debindering treatment include a method of heating the mixture, and a method of exposing the mixture to a gas for decomposing the binder. Accordingly, at least a part of the binder contained in the mixture can be removed. As a result, by preventing a large amount of binder from being transferred into the heating cylinder 7, generation of a large amount of gas in the heating cylinder 7 can be prevented.

A heating temperature for the mixture in the debindering treatment is not particularly limited as long as it is a temperature at which the binder is thermally decomposed, and the heating temperature is preferably 200° C. or higher and 500° C. or lower, and more preferably 250° C. or higher and 450° C. or lower. By setting the heating temperature within the above range, the binder can be appropriately removed while preventing an adverse effect on the metal body 11 due to the debindering treatment.

When the heating temperature is lower than the above lower limit value, a large amount of binder which is not removed remains, and a large amount of gas may be generated in the heating cylinder 7. On the other hand, when the heating temperature is higher than the above upper limit value, there is a concern that an adverse effect due to heat may occur on the metal body 11, or the binder may be completely removed and the C particles 14 may fall off from the metal body 11.

A heating time for the mixture in the debindering treatment is not particularly limited, and may be, for example, 5 minutes or longer, and is preferably 1 hour or longer and 100 hours or shorter, and more preferably 10 hours or longer and 50 hours or shorter. Accordingly, the binder can be appropriately removed while preventing an adverse effect on the metal body 11 due to the debindering treatment.

An amount of the binder, that is, a content of the binder in the thixomolding material 10 after debindering is not particularly limited, and is preferably 0.001 mass % or more and 0.200 mass % or less, more preferably 0.010 mass % or more and 0.100 mass % or less, and still more preferably 0.015 mass % or more and 0.040 mass % or less. By setting the content of the binder in the thixomolding material 10 within the above range, the amount of the binder to be thermally decomposed in the heating cylinder 7 can be prevented from increasing more than necessary while ensuring adhesiveness of the coating portion 12 realized by the adhesive portion 13.

When the content of the binder is less than the above lower limit value, the amount of the binder is insufficient, and the coating portion 12 may easily fall off. On the other hand, when the content of the binder is more than the above upper limit value, the amount of the binder becomes excessive, a large amount of decomposed gas is generated in the heating cylinder 7, and voids may be easily generated in the thixomolded article.

As described above, the method for manufacturing the thixomolding material 10 according to the present embodiment includes the preparation step S102, the stirring step S106, and the debindering step S108. In the preparation step S102, the mixture containing the metal body 11 containing Mg as a main component, the C particles 14 containing C as a main component, the binder, and the solvent is prepared. In the stirring step S106, the mixture is stirred. In the debindering step S108, the stirred mixture is heated to remove at least a part of the binder contained in the mixture, thereby obtaining the thixomolding material 10. In the thixomolding material 10 thus obtained, the mass fraction of the C particles 14 in the total mass of the metal body 11 and the C particles 14 is 5.0 mass % or more and 40.0 mass % or less, and the content of the binder is 0.001 mass % or more and 0.200 mass % or less.

According to such a configuration, it is possible to obtain a thixomolding material 10 capable of easily manufacturing a thixomolded article containing C in a high concentration and having high thermal conductivity. Since the content of the binder is optimized, it is possible to obtain a thixomolding material 10 in which adhesiveness of the coating portion 12 realized by the adhesive portion 13 is ensured and the amount of the binder to be thermally decomposed in the heating cylinder 7 is reduced.

The thixomolding material 10 does not necessarily have to be manufactured by this manufacturing method. That is, the thixomolding material 10 may be manufactured, for example, without going through the debindering step S108.

4. Thixomolded Article

Next, a thixomolded article according to the embodiment will be described.

Figure 4:
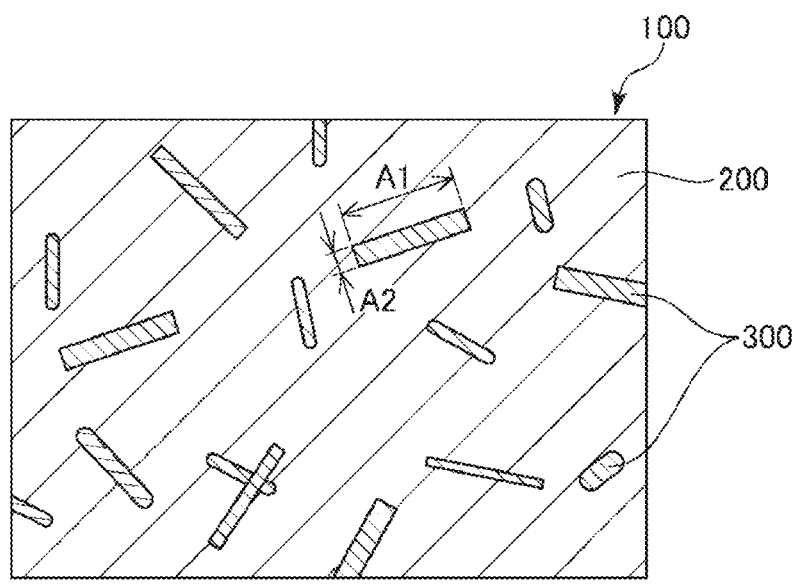
FIG. 4 is a partial cross-sectional view schematically showing a thixomolded article according to the embodiment.

FIG. 4 is a partial cross-sectional view schematically showing the thixomolded article according to the embodiment.

The thixomolded article 100 shown in FIG. 4 is a molded article obtained by a thixomolding method, and includes a matrix portion 200 and a particle portion 300. The matrix portion 200 is a portion mainly derived from the metal body 11 of the thixomolding material 10, and contains Mg as a main component. The particle portion 300 is a portion mainly derived from the coating portion 12 of the thixomolding material 10, and contains C as a main component.

As shown in FIG. 4, when viewing the cross section of the thixomolded article 100, an area occupied by the matrix portion 200 is larger than an area occupied by the particle portion 300. Therefore, the particle portion 300 is in a state of being dispersed in the matrix portion 200.

As shown in FIG. 4, the particle portion 300 has an elongated cross section. The average aspect ratio of the particle portion 300, that is, a ratio of a length of a major axis A1 to a length of a minor axis A2 is 2.0 or more and 20.0 or less, preferably 4.0 or more and 15.0 or less, and more preferably 5.0 or more and 10.0 or less.

When the particle portion 300 has the average aspect ratio as described above, the thermal conductivity of the particle portion 300 itself has large anisotropy. That is, in the cross section shown in FIG. 4, the particle portion 300 has high thermal conductivity in the extending direction of the major axis A1, while having low thermal conductivity in the extending direction of the minor axis A2.

On the other hand, in the thixomolded article 100, the particle portion 300 having the anisotropy in thermal conductivity is contained in a high ratio. Specifically, the content of C in the thixomolded article 100 is 5.0 mass % or more and 40.0 mass % or less, preferably 7.0 mass % or less and 25.0 mass % or less, and more preferably 10.0 mass % or more and 20.0 mass % or less.

By setting the content of C within the above range, when the particle portion 300 has the above-described average aspect ratio, the probability that the particle portions 300 in the thixomolded article 100 come into contact with or come close to each other increases. Accordingly, thermal conduction through the particle portions 300 is likely to occur, and the thermal conductivity of the thixomolded article 100 can be enhanced.

When the particle portion 300 has the above-described average aspect ratio and the content of C is within the above range, the particle portion 300 functions as a filler that enhances mechanical properties such as tensile strength and rigidity. As a result, a thixomolded article 100 having excellent mechanical properties can be obtained.

When the average aspect ratio of the particle portion 300 is less than the above lower limit value, and when the content of C is less than the above lower limit value, the probability that a distance between the particle portions 300 becomes large increases, and thermal conduction through the particle portions 300 is less likely to occur. On the other hand, when the average aspect ratio of the particle portion 300 is more than the above upper limit value, and when the content of C is more than the above upper limit value, the mechanical properties of the thixomolded article 100 may be deteriorated.

For measurement of the content of C, for example, an oxygen gas flow combustion (high-frequency induction furnace combustion)—infrared absorption method defined in JIS G 1211:2011 is used. Examples of an analyzer corresponding to this measurement method include a carbon/sulfur analyzer manufactured by LECO Japan Co., Ltd.

An average value of the major axis A1 of the particle portion 300 is not particularly limited, and is preferably 10 µm or more, and more preferably 20 µm or more and 100 µm or less.

The average aspect ratio and the average value of the major axis A1 are obtained by observing the cross section of the thixomolded article 100 with an optical microscope and performing image processing. For the image processing, for example, image analysis software OLYMPUS Stream or the like can be used. A magnification of the observation image is preferably 300 times or more.

For measurement of the content of C, for example, the oxygen gas flow combustion (high-frequency induction furnace combustion)—infrared absorption method defined in JIS G 1211:2011 is used. Examples of an analyzer corresponding to this measurement method include the carbon/sulfur analyzer manufactured by LECO Japan Co., Ltd.

A thermal conductivity of the thixomolded article 100 is preferably 53 W/(m·K) or more, more preferably 58 W/(m·K) or more, and still more preferably 62 W/(m·K) or more. The thixomolded article 100 having such a thermal conductivity can also be applied to, for example, a portion requiring heat dissipation.

The thermal conductivity of the thixomolded article 100 is measured by, for example, a laser flash method.

The thixomolding material, the method for manufacturing the thixomolding material, and the thixomolded article according to the present disclosure are described above based on the illustrated embodiments. However, the thixomolding material and the thixomolded article according to the present disclosure are not limited to the above embodiment, and may be, for example, those obtained by adding any component to the above embodiment. The method for manufacturing the thixomolding material according to the present disclosure may be one obtained by adding any desired step to the above embodiment.

Examples

Next, specific examples of the present disclosure will be described.

5. Manufacturing of Thixomolding Material 5.1. Sample No. 1

First, a magnesium alloy chip as a metal body, graphite particles as C particles, a binder, and a solvent were mixed to obtain a mixture. As the magnesium alloy chip, a chip of 4 mm×2 mm×1 mm made of an AZ91D alloy manufactured by STU, Inc. was used. The AZ91D alloy is an Mg-based alloy containing 9 mass % of Al and 1 mass % of Zn. In addition, as the binder, "Paraffin Wax 115" manufactured by Nippon Seiro Co., Ltd. was used. The melting point of the paraffin wax 115 was 48° C. Further, as the solvent, 35 mL of isopropanol was used per 4.5 g of the binder.

Next, the obtained mixture was heated to obtain a dried body. Subsequently, the obtained dried body was stirred. Thereafter, an operation of further heating the stirred dried body and then stirring the heated dried body was repeated three times. For stirring, a method of shaking a container containing the dried body was used.

Next, the stirred dried body was subjected to a debindering treatment. Accordingly, at least a part of the binder was removed to obtain a thixomolding material. In the obtained thixomolding material, almost the entire surface of the magnesium alloy chip was coated with the graphite particles. Manufacturing conditions in the above manufacturing method are shown in Table 1. In Table 1, a charge amount of the C particles is a ratio of a mass of the charged C particles to a total mass of the magnesium alloy chip and the C particles. A charge amount of the binder is a ratio of a mass of the charged binder to a mass of the entire thixomolding material.

5.2. Sample Nos. 2 to 4

Thixomolding materials were obtained in the same manner as in Sample No. 1 except that the manufacturing conditions were changed as shown in Table 1.

5.3. Sample No. 5

A thixomolding material was obtained in the same manner as in Sample No. 1 except that the graphite particles and the binder were not used.

5.4. Sample Nos. 6 to 8

Thixomolding materials were obtained in the same manner as in Sample No. 1 except that the manufacturing conditions were changed as shown in Table 1.

5.5. Sample No. 9

A thixomolding material was obtained in the same manner as in Sample No. 1 except that carbon black was used instead of the graphite particles.

5.6. Sample Nos. 10 to 13

Thixomolding materials were obtained in the same manner as in Sample No. 1 except that the manufacturing conditions were changed as shown in Table 1.

5.7. Sample No. 14

A thixomolding material was obtained in the same manner as in Sample No. 1, except that the graphite particles were used, but the binder was not used.

In Table 1, among the thixomolding materials of the respective sample Nos., those corresponding to the present disclosure were referred to as "Examples," and those not corresponding to the present disclosure were referred to as "Comparative Examples".

6. Evaluation of Thixomolding Material 6.1. Amount of C Particles after Debindering For the thixomolding material of each sample No., an amount of the C particles after debindering was calculated by the following method.

First, a mass M1 of the thixomolding material was measured. Since the thixomolding material is debindered, the remaining binder is regarded as substantially zero, and is not considered for calculation. Next, the thixomolding material was immersed in acetone and washed with an ultrasonic cleaner for 10 minutes. Accordingly, the adhered C particles can be removed, and only the magnesium alloy chip can be taken out. Next, the magnesium alloy chip after washing was taken out from acetone, dried, and then a mass M2 was measured.

Then, a mass fraction of the C particles with respect to the magnesium alloy chip calculated by $(M1-M2)/M1 \times 100$ was defined as an amount [%] of the C particles after debindering. Calculation results are shown in Table 1.

6.2. Adhesion Rate of C Particles

An adhesion rate of the C particles was calculated by dividing the amount of the C particles after debindering by the charge amount of the C particles. Calculation results are shown in Table 1.

6.3. Amount of Binder after Debindering

For the thixomolding material of each sample No., an amount of the binder after debindering was calculated by the following method.

First, a thermogravimetric change in a temperature range of 50° C. to 450° C. of one thixomolding material was measured by a differential thermogravimetric simultaneous measurement device (TGA/DSC1LF) manufactured by Mettler-Toledo. The temperature was increased at a temperature increase rate of 10° C./min while air was allowed to flow in at a flow rate of 30 mL/min in the atmosphere. Then, when a weight change per unit time decreased to 0.03 wt % or less, it was determined that debindering was completed, and a weight reduction from the weight at 50° C. to the weight at the completion of the debindering was calculated. The calculated weight reduction was defined as the amount of binder after debindering. Calculation results are shown in Table 1.

TABLE 1

| | | Manufacturing condition for thixomolding material | | | | | | | | | Evaluation result of thixomolding material | | |
|---|---|---|---|---|---|---|---|---|---|---|---|---|---|
| | | C particles | | | | | | Number | Debindering | Debindering | C particles | | Binder |
| Sample No. | Example/ Comparative Example | Type | Average particle diameter μm | Charge amount mass % | Binder Charge amount mass % | Drying temperature ° C. | Drying time min | of repetitions time(s) | temperature ° C. | time h | Amount after debindering mass % | Adhesion rate % | Amount after debindering mass % |
| 1 | Example | Graphite particles | 5 | 10 | 5 | 65 | 120 | 3 | 320 | 24 | 6.4 | 64 | 0.020 |

TABLE 1-continued

| | | | Manufacturing condition for thixomolding material | | | | | | | | Evaluation result of thixomolding material | | |
|---|---|---|---|---|---|---|---|---|---|---|---|---|---|
| | | | C particles | | | | | | Number | Debind- | | C particles | | Binder |
| Sample No. | Example/ Comparative Example | Type — | Average particle diameter μm | Charge amount mass % | Binder Charge amount mass % | Drying temp- erature ° C. | Drying time min | of rep- etitions time(s) | ering temp- erature ° C. | Debind- ering time h | Amount after debindering mass % | Ad- hesion rate % | Amount after debindering mass % |
| 2 | Example | Graphite particles | 5 | 20 | 8 | 65 | 120 | 3 | 400 | 24 | 14.3 | 71 | 0.018 |
| 3 | Example | Graphite particles | 5 | 30 | 20 | 65 | 120 | 3 | 320 | 24 | 27.4 | 91 | 0.028 |
| 4 | Example | Graphite particles | 10 | 40 | 15 | 65 | 120 | 3 | 290 | 48 | 35.3 | 88 | 0.027 |
| 5 | Comparative Example | Graphite particles | — | 0 | 0 | — | — | — | — | — | — | — | — |
| 6 | Comparative Example | Graphite particles | 10 | 50 | 35 | 65 | 120 | 3 | 220 | 24 | 43.5 | 87 | 0.250 |
| 7 | Comparative Example | Graphite particles | 5 | 3 | 5 | 65 | 120 | 3 | 320 | 24 | 0.4 | 12 | 0.020 |
| 8 | Graphite Example | Compar- ative particles | 5 | 5 | 0.5 | 65 | 120 | 3 | 460 | 24 | 0.4 | 8 | 0.0005 |
| 9 | Example | Carbon black | 50 nm | 10 | 2 | 65 | 120 | 3 | 320 | 24 | 5.3 | 53 | 0.021 |
| 10 | Example | Graphite particles | 5 | 10 | 5 | 65 | 120 | 2 | 400 | 2 | 8.5 | 85 | 0.160 |
| 11 | Example | Graphite particles | 25 | 10 | 10 | 65 | 120 | 0 | 250 | 12 | 8.0 | 80 | 0.032 |
| 12 | Comparative Example | Graphite particles | 5 | 10 | 5 | 65 | 120 | 3 | — | — | 3.5 | 35 | 4.8 |
| 13 | Comparative Example | Graphite particles | 5 | 10 | 5 | 65 | 120 | 1 | 220 | 2 | 4.5 | 45 | 0.320 |
| 14 | Comparative Example | Graphite particles | 5 | 10 | 0 | — | — | — | — | — | 1.0 | 10 | — |

As shown in Table 1, it is confirmed that in the thixomolding materials corresponding to Examples, although the amount of the binder is reduced to the minimum by debindering, the C particles are adhered at a sufficient adhesion rate.

7. Manufacturing of Thixomolded Article
7.1. Sample No. 15

The thixomolding material of Sample No. 1 was charged into an injection molding machine to obtain a thixomolded article of Sample No. 15. As the injection molding machine, a magnesium injection molding machine JLM75MG manufactured by The Japan Steel Works, Ltd. was used.

7.2. Sample Nos. 16 to 28

Thixomolded articles were obtained in the same manner as in Sample No. 15 except that the manufacturing conditions were changed as shown in Table 2.

8. Analysis of Thixomolded Article
8.1. Cross Section Observation

Figure 5:
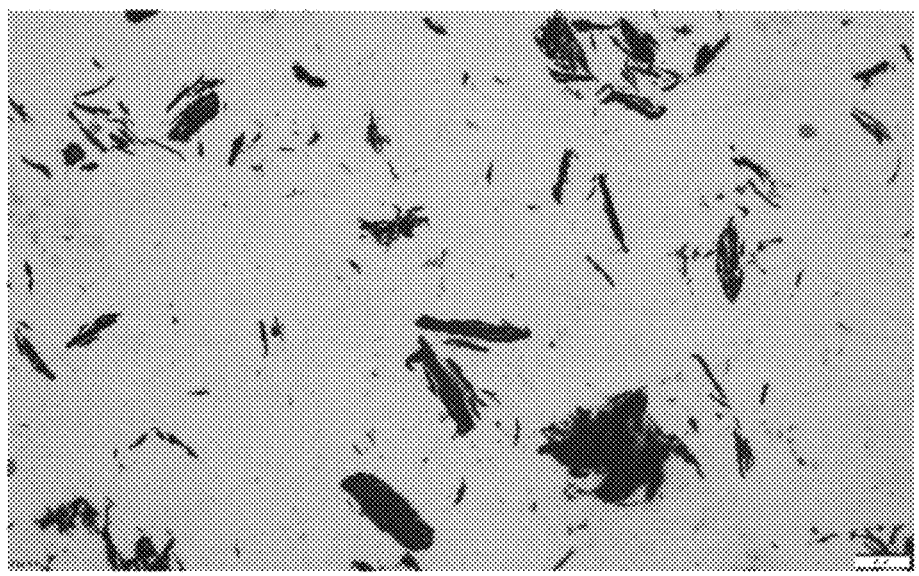
FIG. 5 is an observation image of a cut surface of the thixomolded article corresponding to Examples when observed with an optical microscope.

The thixomolded article of each sample No. was cut, and the cut surface was observed with an optical microscope. FIG. 5 is an observation image when the cut surface of the thixomolded article corresponding to Examples is observed with the optical microscope. In FIG. 5, a particle portion exhibiting a dark color and a matrix portion exhibiting a light color are observed. Most of the particle portion has a relatively large aspect ratio and an elongated shape. The obtained average aspect ratios of the particle portion are shown in Table 2.

8.2. Content of C

A content of C in the thixomolded article of each sample No. was measured by elemental analysis. Measurement results are shown in Table 2.

9. Evaluation of Thixomolded Article
9.1. Moldability

The thixomolded article of each sample No. was observed, and a molded state of the thixomolded article was evaluated based on melt fluidity, presence or absence of internal defects due to inclusion of blowholes and air, and the like. Specifically, those having many defects in melt fluidity and internal defects were evaluated as "NG," and those having relatively few such defects were evaluated as "OK". Evaluation results are shown in Table 2.

9.2. Dispersibility of Particle Portion

Dispersibility of the particle portion was evaluated based on the observation image of the thixomolded article of each sample No. Specifically, those in which significant aggregation of the particle portion was observed were evaluated as "NG," and those in which such aggregation was not observed were evaluated as "OK". Evaluation results are shown in Table 2.

9.3. Thermal Conductivity

The thermal conductivity of the thixomolded article of each sample No. was measured. Measurement results are shown in Table 2.

9.4. Tensile Strength

The tensile strength of the thixomolded article of each sample No. was measured. Specifically, a test piece conforming to JIS standard was formed from the thixomolded article, and the tensile strength at 25° C. was measured by a tensile tester. Then, measurement results were evaluated in light of the following evaluation criteria.
  A: The tensile strength is relatively high
  B: The tensile strength is relatively slightly high
  C: The tensile strength is relatively low
  Evaluation results are shown in Table 2.

TABLE 2

| Sample No. | Example/ Comparative Example | Sample No. of material | Particle portion Average aspect ratio — | Content of C mass % | Moldability — | Dispersibility of particle portion MPa | Thermal conductivity W/(m · K) | Tensile strength — |
|---|---|---|---|---|---|---|---|---|
| 15 | Example | 1 | 9.0 | 7.0 | OK | OK | 55 | A |
| 16 | Example | 2 | 10.0 | 15.0 | OK | OK | 58 | A |
| 17 | Example | 3 | 5.0 | 28.0 | OK | OK | 64 | B |
| 18 | Example | 4 | 6.0 | 36.0 | OK | OK | 68 | B |
| 19 | Comparative Example | 5 | — | 0.0 | OK | — | 51 | A |
| 20 | Comparative Example | 6 | 2.0 | 42.0 | NG | — | — | C |
| 21 | Comparative Example | 7 | 12.0 | 0.8 | OK | NG | 51 | A |
| 22 | Comparative Example | 8 | 10.0 | 1.2 | OK | NG | 51 | A |
| 23 | Example | 9 | 1.5 | 6.0 | OK | OK | 53 | A |
| 24 | Example | 10 | 3.0 | 5.0 | OK | OK | 65 | B |
| 25 | Example | 11 | 5.0 | 7.0 | OK | OK | 56 | A |
| 26 | Comparative Example | 12 | 11.0 | 6.0 | NG | NG | 45 | B |
| 27 | Comparative Example | 13 | 4.0 | 3.0 | OK | NG | 51 | B |
| 28 | Comparative Example | 14 | 2.0 | 0.5 | OK | NG | 52 | A |

As is clear from Table 2, it is confirmed that the thixomolded articles corresponding to Examples have higher thermal conductivity than the thixomolded articles corresponding to Comparative Examples. In addition, it is confirmed that when the content of C is too low, the thermal conductivity cannot be sufficiently enhanced, and on the other hand, when the content of C is too high, the moldability is poor and the mechanical properties of the thixomolded article are low.

Further, in Comparative Examples in which no binder is added in the manufacturing of the thixomolding material, the thermal conductivity of the thixomolded article cannot be enhanced. The reason for the above includes that C particles fall off from the magnesium alloy chip and the C particles cannot be sufficiently dispersed.

What is claimed is:

1. A thixomolding material comprising:
   a metal body that contains Mg as a main component, wherein Mg has highest content by mass in the metal body than other additive components in the metal body; and
   a coating portion that is adhered to a surface of the metal body via a binder and contains C particles containing C, wherein
     an average particle diameter of the C particles is 1 μm or more and 100 μm or less, and
     a mass fraction of the C particles in a total mass of the metal body and the C particles is 5.0 mass % or more and 40.0 mass % or less.

2. The thixomolding material according to claim 1, wherein the binder contains waxes.

3. The thixomolding material according to claim 1, wherein the C particles are graphite particles.

* * * * *